Sept. 15, 1931.    R. F. HILL    1,823,428
ANCHORAGE DEVICE
Filed Feb. 14, 1930
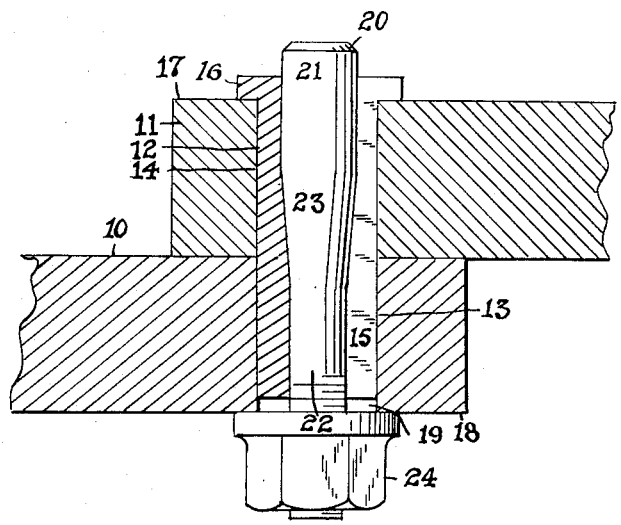
INVENTOR
R. F. Hill
by F. N. Barber
Attorney Patented Sept. 15, 1931

1,823,428

UNITED STATES PATENT OFFICE

ROWLAND F. HILL, OF TOLEDO, OHIO, ASSIGNOR TO THE NATIONAL SUPPLY COMPANY, OF TOLEDO, OHIO, A CORPORATION OF OHIO

ANCHORAGE DEVICE

Application filed February 14, 1930. Serial No. 428,363.

My invention relates to anchorage devices.

It is an object of this invention to provide an anchorage device having a split or slotted sleeve in combination with a tapered pin which expands the sleeve to lock it tightly in alined holes in more than one element and operates in conjunction with a nut to cause the sleeve to be clamped to the elements.

The accompanying drawing, shows a section of my anchorage device and the adjacent portions of two elements connected together thereby, the section being taken through the longitudinal center of the sleeve and the locking pin being shown in side elevation.

On the drawing, 10 and 11 are two elements connected together by my invention. 12 is a cylindrical sleeve fitting the two alined holes 13 and 14 in the elements 10 and 11. The sleeve has the longitudinal open slot 15 extending from end to end thereof and from the inside surface to the outside surface. The sleeve has at one end the flange 16 which lies upon the outer face 17 of the element 11. The sleeve does not extend quite to the face 18 of the element 10, so that there is left a space 19 between the end of the sleeve and the face 18.

20 is a pin extending entirely through the sleeve axially and projecting therefrom at each end. It has the large cylindrical section 21 at one end, the smaller cylindrical section 22 at the other end, and the tapering section 23 connecting the other sections together. These three sections fit correspondingly-shaped walls in the sleeve. The larger end of the pin 20 is in the end which has the flange 16 and the smaller end is threaded and provided with the nut 24 which bears against the face 18.

The sleeve with its flange 16 in cooperation with the pin and the nut clamps the elements 10 and 11 together so that they will not have any motion, one away from the other or parallel with each other. The pin expands the sleeve so as to ensure a snug fit of the sleeve in the holes in the elements.

I do not limit my invention to the position of the pin-section 23. The space 19 ensures that the end of the sleeve will not engage the nut and thereby stop adjustment of the sleeve to take up any looseness between the elements 10 and 11, and between the element 11 and the flange 16.

I claim—

The combination of two overlapping structures having a continuous hole from the outer face of one structure to the outer face of the other structure, a longitudinally-slotted sleeve in the hole, the sleeve having a flange lying on the outer face of one structure and having its inner wall tapered opposite the joint between the two structures and for some distance at each side thereof, a pin positioned within the hole and having a tapered section cooperating with the said tapered wall, and a nut working on the pin and against the outer face of the structure not engaged by the said flange, to cause the sleeve and nut to clamp the structures together and to cause the sleeve to be expanded opposite the said joint and at each side thereof and making a snug fit with the wall of the hole opposite the said tapered wall, the end of the sleeve not bearing the flange being spaced from the adjacent face of the nut.

In testimony whereof I affix my signature.

ROWLAND F. HILL.